United States Patent
Ellis

[11] 3,851,157
[45] Nov. 26, 1974

[54] SELF-CORRECTING FEEDBACK CONTROL SYSTEM

[75] Inventor: Stanley H. Ellis, Palm Beach Gardens, Fla.

[73] Assignee: United Aircraft Corporation, East Hartford, Conn.

[22] Filed: July 9, 1973

[21] Appl. No.: 377,867

[52] U.S. Cl............. 235/150.1, 60/39.28, 328/158, 244/77 R, 235/150.21
[51] Int. Cl......................... F02k 9/00, G05b 23/02
[58] Field of Search......... 235/150.1, 151.3, 151.31, 235/153 AE; 60/39.28 R, 39.28 T; 244/77 M, 77 R

[56] References Cited
UNITED STATES PATENTS

| | | | |
|---|---|---|---|
| 3,019,604 | 2/1962 | Hall............................... | 60/39.28 T |
| 3,544,778 | 1/1970 | Masters, Jr................ | 340/146.1 BE |
| 3,667,057 | 5/1972 | Pfersch, Jr. et al............. | 307/219 X |
| 3,686,493 | 8/1972 | Schmid........................... | 307/219 X |

*Primary Examiner*—Eugene G. Botz
*Attorney, Agent, or Firm*—Donald F. Bradley

[57] ABSTRACT

A self-correcting control system for a controlled device such as an engine is disclosed in which the outputs from a plurality of combinations of sensors measuring selected system parameters produce multiple estimates of one or more variables of operation of the control system, the controlled variables. The multiple estimates are combined into a weighted average of the controlled variables, and individual estimates which differ by more than a specified amount from the weighted average are eliminated from consideration. After elimination of the invalid estimates, a revised weighted average of the controlled variables is computed. The revised average estimate of each controlled variable is then compared with a signal indicative of the commanded value of the controlled variable, and any error is used to regulate actuators which in turn control the controlled device. Predetermined weighting factors are assigned to individual estimates of each controlled variable to reflect both the accuracy of the feedback sensors and the ability of the feedback parameters being sensed to form a good estimate of the controlled variables. Individual feedback sensor combinations whose estimates of the controlled variable have been eliminated are continuously monitored, and whenever the eliminated sensor combination produces an estimate of a controlled variable which falls within the prescribed boundaries, the estimate is reconnected. Examples are provided for an engine control with four feedback sensors, all nonordered combinations of the sensors providing six estimates of each of two controlled variables, with two actuators being controlled in response to the error in the variables.

16 Claims, 7 Drawing Figures

SELF-CORRECTING FEEDBACK CONTROL SYSTEM

BACKGROUND OF THE INVENTION

1. Field of the Invention

This invention relates to a control system for a controlled device, and particularly to a self-correcting control system which will maintain full capability after one or more failures of sensor system elements.

This invention also relates to control systems for controlled devices which are controlled by signals which cannot be measured directly, for example the thrust of a rocket during flight.

In carrying out the invention, multiple estimates of the control system variables are made as a function of signals produced by a plurality of feedback sensors. Estimates which deviate more than a predetermined amount from the weighted mean estimate of the controlled variables such as would result from a failed sensor are eliminated, and a revised weighted average of the variable is produced which may be used to regulate the control system.

As a specific example of the control system, a control for an engine is described.

2. Description of the Prior Art

In present day control systems there is a demand for high reliability but with minimum cost and complexity. For example, in manned spacecraft applications it is required that electronic control systems have both high reliability and the capability of operating normally after two consecutive failures, with a third failure being of the fail-safe type. Redundant controls and logic which delete failed elements will satisfy the above requirements, but the increased number of parts due to redundancy also increases the failure rate.

There are numerous prior art techniques which detect and/or correct failures in most sections of a digital electronic control system. For example, redundant actuators can be made to share the load by a current equalization technique in which a failed actuator can be detected by an abnormal current demand. The memory of a digital computer can automatically correct one or more errors and detect the presence of a further error, at the expense of additional core storage. Correction of failures in feedback sensors, however, provides a more difficult problem because of the large number of types of sensors used in most control systems and the large number of each type required for failure tolerance. For example, the control system for a typical rocket engine with a preburner turbo-pump drive has six different types of feedback sensors measuring quantities such as turbine discharge temperatures, chamber pressure, propellant flows and pump speeds. Under current fail-safe guidelines five sensors of each type may be required with a potential of 30 sensors, greatly increasing the number of connecting lines, the amount of monitoring equipment and the computer size for the control system.

The present invention overcomes the limitations of the prior art and provides a self-correcting control system for a controlled device such as a gas turbine or a rocket engine which uses redundant information synthesized from combinations of sensor inputs to enable the control system to comply with stringent fail-safe requirements without increasing the number of existing sensors. In the case of rocket engines, the information from the six existing sensors may be combined in pairs to provide 15 estimates for each controlled variable and the estimates are combined into a best estimate for control feedback using a weighted average technique, more weight being given to pairs of sensors with better measurement capability. Control is maintained in the presence of failed sensors by detecting when a failure has occurred by comparing the deviation of each individual estimate of the variable from the mean with the initial deviation before failure. The initial deviation can be established during ground tests when all sensors can be monitored and verified to be operating properly. This process of detecting failures and excluding them from the average is called "editing." In the present context, "editing" does not mean permanent removal from the system, but a temporary exclusion or ignoring of the estimate of the controlled variable provided by the failed sensor.

An additional advantage of the present invention is that it provides control of a system where the primary control signal or variable cannot be directly measured, such as the thrust of a rocket engine during flight. The required information as to the variable is produced by combining the information from combinations of the sensors to obtain estimates of the variable which is desired but which cannot be measured directly.

It is therefore an object of this invention to provide an improved decision network for a control system which will produce a reliable control signal in the presence of one or more erroneous input signals.

Another object of the present invention is a decision network for a control system which will improve the accuracy of the control system by including in the control signal additional reliable information and by eliminating therefrom extreme data values.

A further object of the present invention is a decision network for a control system which will provide accurate control signals even in the presence of input signals from failed sensors.

SUMMARY OF THE INVENTION

In accordance with the preferred embodiment of this invention, there is disclosed a self-correcting control system for a controlled device such as a rocket engine. The control system comprises two control valves, one for each of two controlled parameters, for example a first oxidizer valve controlling flow to a combustion chamber ahead of the turbines which drive the propellant pumps, and a second oxidizer valve controlling flow to a combustion chamber downwstream of the turbines. Two variables of operation, the controlled state variables, thrust and mixture ratio, neither of which can be sensed directly, are estimated by information from a plurality of pairs of sensors. Multiple estimates are made of the variables of operation of the control system from the information from pairs of sensors with varying weights given to the information provided by each sensor. The number of possible estimates of each of the variables of operation is determined by the number of sensors ($M$) and the number of independent control valves ($N$) using the formula $m!/(M-N)!N!$. For the example described herein having two independent control valves ($N = 2$) and four feedback sensors ($M = 4$), the number of sensor combinations, each of which provides an estimate of each of the two variables of operation, is $4·3·2·1/(2·1)\ 2·1 = 6$. The multiple estimates are combined into a weighted average of the control variables, and individual estimates which differ by more than a specified amount from the weighted average are eliminated from consideration by the editing procedure. After elimination of the invalid estimates, a revised weighted average of the system variables is computed, and the revised average estimate is then compared with a signal such as provided by the pilot indicative of the commanded value of the control variable. Any error is used to regulate the operation of the actuators (valves) which in turn control the rocket engine and thereby null the error signal.

The production of the estimates of the controlled variables from the information provided by the plurality of pairs of feedback sensors may be performed on a digital computer, or may be performed in an analog fashion as described herein.

DESCRIPTION OF THE PREFERRED EMBODIMENT

As indicated previously, the present invention will be described with respect to a rocket engine, although it will be apparent to those skilled in the art that any control system in which sensors provide information as to the state of a controlled variable may be implemented according to the present invention. The applicability of this invention to a nonaugmented twin spool turbojet engine will also be described. It should be noted that nonlinear systems such as a turbofan engine may require modifications or additions to the present invention such as an increase in the permissible deviations at part throttle, but such modifications will be apparent to those skilled in the art and do not change the basic teachings of the present invention.

A requirement of the present self-correcting control system is that there must be at least as many different types of sensor signals as there are actuators to be controlled, and more total sensors than there are actuators to be controlled to provide for accurate operation after failure of a sensor. In the preferred embodiment of this invention, a control system for the control of two actuators is described, therefore, there must be at least two different types of sensed parameters. There may be a plurality of sensor signals of any one type, but this is not a requirement of the invention. Another requirement is that in order to tolerate failures there shall be more total sensor signals than actuators, and that these sensor signals shall be related by the process in some known fashion. For a system having two actuators as described, there must therefore be at least two different types of sensed signals, and three sensed signals to tolerate one failure, four sensed signals to tolerate two failures, and so on. In other words, in a system in which two actuators are controlled, there must remain at least two types of good sensors after a failure has occurred. There must also be as many controlled variables as there are actuators being controlled.

Figure 1:
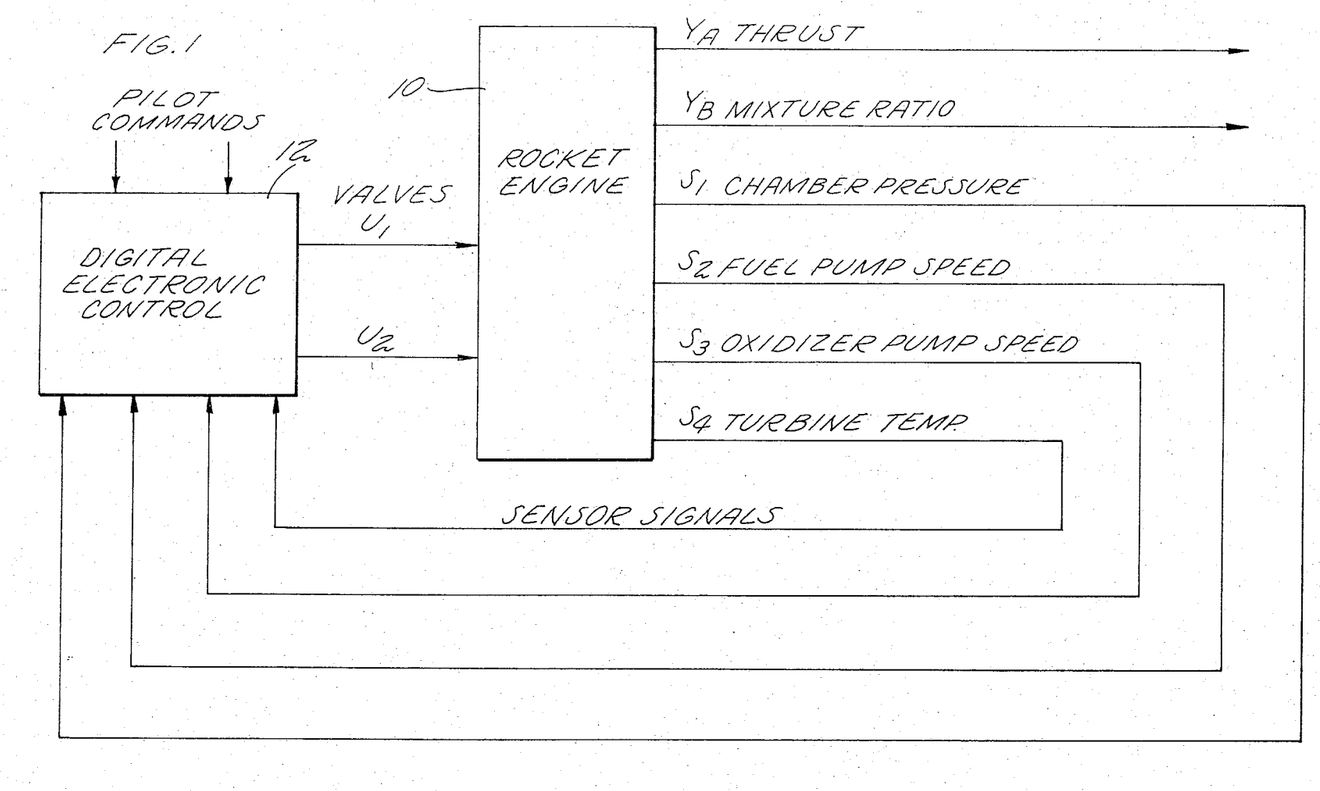
FIG. 1 shows schematically a rocket engine control system.

FIG. 1 shows in schematic block diagram form a control system for a rocket engine. For the exemplary rocket engine described, two valves are required for engine control, namely, an oxidizer valve $U_1$ controlling flow to the combustion chamber upstream of the turbines that are used to drive the oxidizer and fuel pumps, and oxidizer valve $U_2$ controlling the flow to the combustion chamber downstream of the turbines. It is noted that other valves such as fuel valves may be chosen to regulate the rocket engine in place of the oxidizer valves. Once the two actuator valves are selected, there can be no other independent valves in the exemplary control system. Any other valves must be slaves to those valves being controlled, e.g., any additional valves must be some function of the same variables used to control the selected valves. For instance if a third independent control valve were added, the control system must be modified to produce estimates based on combinations of three sensor signals. For six sensors ($M = 6$) and three valves ($N = 3$) the formula $M!/(M-N)! \, N! = 20$ estimates of each of three controlled variables, i.e., 20 combinations of triplets. In contrast, the same six sensors with a two valve system would give $6!/4!2! = 15$ estimates of two controlled variables from 15 combinations of pairs, while four sensors in a two valve system would give six estimates of each controlled variable.

The control system described herein relates to the logic controlling the motion of the two primary valves $U_1$ and $U_2$ from errors in the two controlled variables thrust ($Y_A$) and mixture ratio ($Y_B$). Neither of the variables of thrust or mixture ratio can be sensed directly in flight.

FIG. 1 shows how the present control system may be implemented using digital electronic controls which may be the preferred embodiment for certain applications. The operating conditions of the rocket engine 10 are estimated from four sensors identified as $S_1$, chamber pressure; $S_2$, fuel pump speed; $S_3$, oxidizer pump speed; and $S_4$, turbine discharge temperature. The four signals representative of the values of sensed parameters $S_1$ through $S_4$ are fed to a digital electronic control 12 in which the estimates of the two control variables, thrust and mixture ratio, are computed. The estimates of the controlled variables are compared with the required values of the controlled variables such as may be provided by input signals to the digital electronic control 12 from pilot commands. The two valves $U_1$ and $U_2$ are then adjusted to regulate the oxidizer flows to the combustion chambers upstream and downstream of the turbines, respectively, to thereby control the variables, thrust and mixture ratio.

Estimates of the two controlled variables, thrust and mixture ratio, can be made from any pair of sensed parameters. It is apparent, however, that some estimates are much better than others. From the four different sensor signals, assuming four types of sensors each of which produces one signal, there are six possible no-nordered pairs that will give both an estimate of thrust and an estimate of mixture ratio. If the estimates from the six different pairs are combined into weighted average estimates of thrust and mixture ratio, a greater accuracy is provided than with using only the feedback from any given pair of sensors because the mean or average of many readings has a lower statistical variance than any of the individual elements.

Any of several different methods may be used to provide the weighting factor given to each of the pairs of parameters used to estimate the controlled variables. For example, the better estimates may be given more weight by dividing each estimate by the root-sum-square error of the controlled variable that is produced by one standard deviation of error in both parameters used in the estimate. Additional weight may be given to pairs of sensors of any one type when redundant readings agree within specified limits. For example, in a simplified format, if two signals of one type agree within specified limits, they may be given an additional weighting factor of two, whereas if redundant signals disagree, or if there is only one signal of a particular type, the additional weighting factor may be set at one. These additional weighting factors would then be multiplied by the predetermined weighting factors described previously. When selecting weighting factors it is important to limit the authority of any signal in order to avoid retention of bad signals and editing of good signals. A preferred method is to select weighting factors that limit the voting rights of any sensor to less than 45 percent of the total votes.

Figures 2, 7:
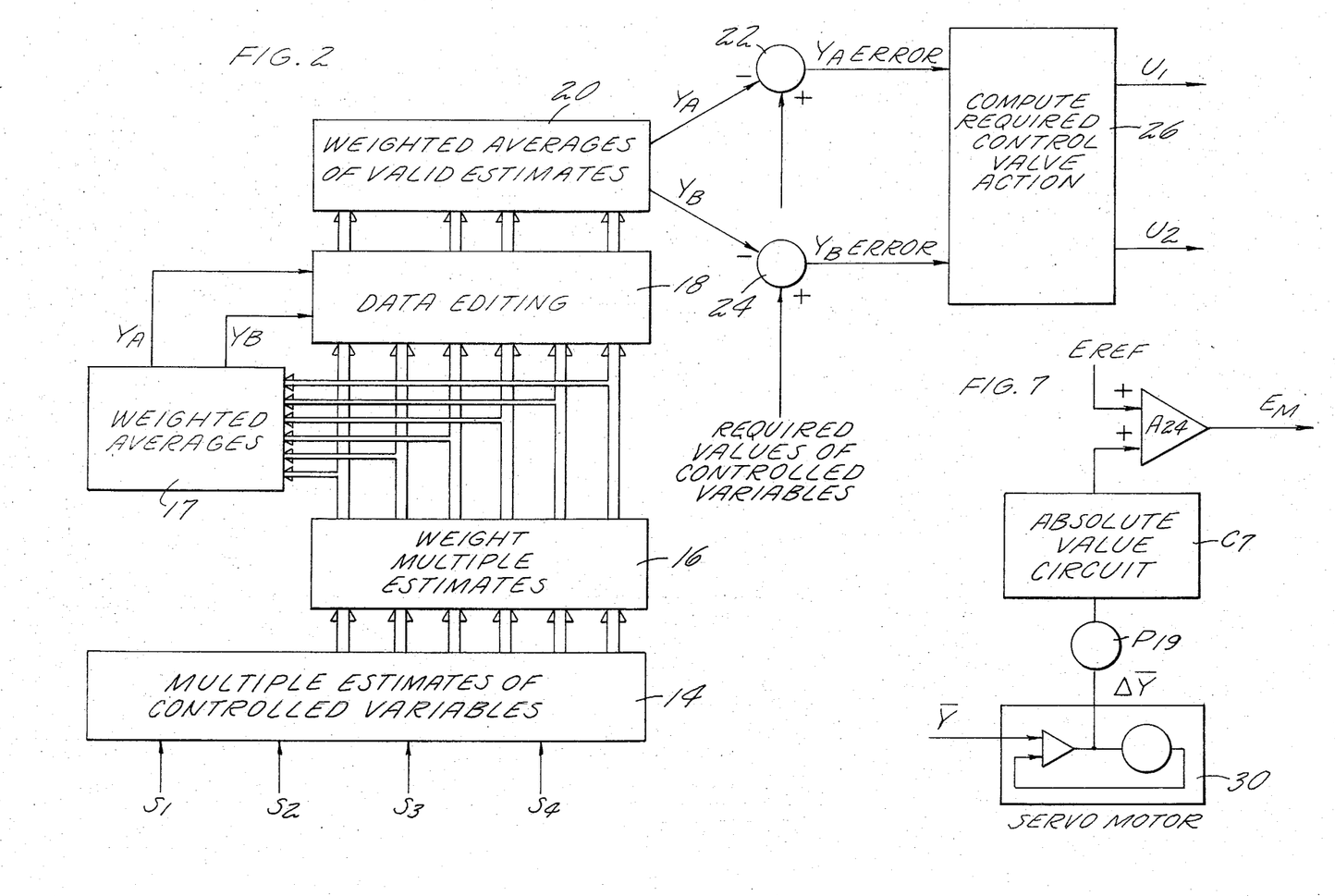
FIG. 2 is a schematic control logic diagram for the control system of FIG. 1.
FIG. 7 is a schematic diagram of a circuit for increasing the permitted error in the system of FIG. 2 during transients.

A schematic control logic diagram describing the principles of the invention is shown in FIG. 2. The four different types of signals from the rocket engine 10 of FIG. 1 produced by sensors and described as $S_1$ through $S_4$ are fed to a block 14 where multiple estimates of the controlled variables, thrust and mixture ratio, are formed from each sensor pair. The predetermined weighting factors are applied to each of the signals in block 16 and combined into a weighted average in block 17.

Editing boundaries on which editing decisions are based are set by the control on either side of the average estimate of the controlled variables. Individual estimates that are outside the editing boundaries are deleted as shown by block 18, and the weighted averages are recomputed in block 20 from the remaining valid estimates.

These weighted corrected, average estimates of each of the controlled variables, $Y_A$ and $Y_B$ which for the example given are thrust and mixture ratio, are then compared with the required values in comparators 22 and 24 to produce error signals $Y_A$ and $Y_B$ error from which control valve action is determined and produced in block 26. The required values of the controlled variables may be provided, for example, as a result of movement of the power lever by the pilot.

FIGS. 3 through 6 show a specific analog implementation of the control system shown schematically in FIG. 2, and more particularly a signal processing circuit for producing an estimate of one of the controlled variables $Y_A$ or $Y_B$ of FIG. 2. For simplicity, a description will be provided only for the portion of the circuit defining controlled variable $Y_A$. A similar circuit with different gains but the same input signals would be necessary to produce the estimate of the other controlled variable, $Y_B$.

Continuing with the example of a rocket engine, it will be presumed that the controlled variable of operation $Y_A$ to be estimated is thrust, and that the four rocket engine sensor signals are $S_1$, chamber pressure; $S_2$, fuel pump speed; $S_3$, oxidizer pump speed; and $S_4$, turbine discharge temperature. Other parameters may obviously be sensed in place of those chosen.

FIGS. 3 through 6 are interconnected, but the connecting lines between the blocks have been omitted for purposes of clarity. The connections are indicated by like symbols in each block.

Figure 3:
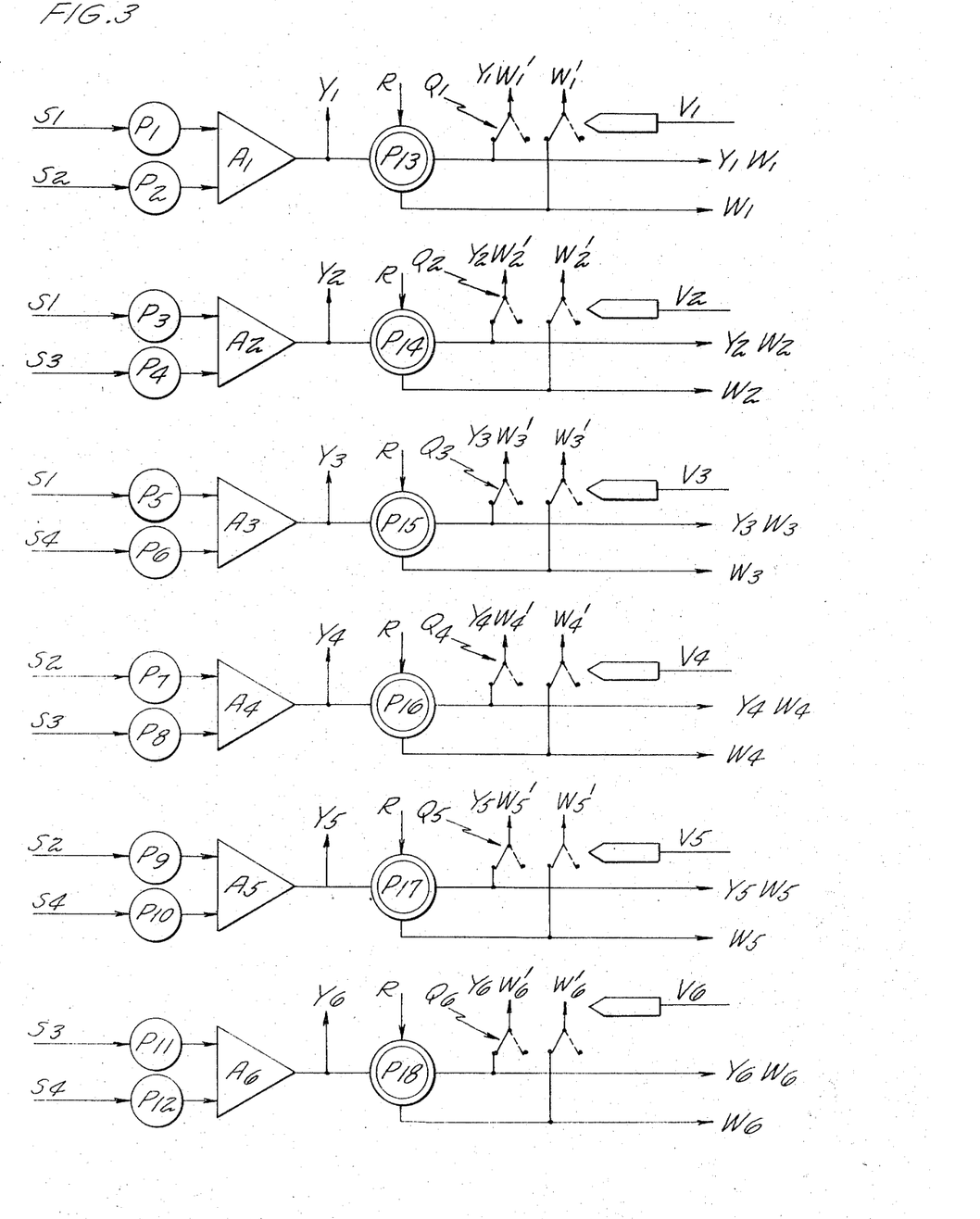
FIG. 3 is a schematic diagram of a preferred implementation of the weighting factor computation of FIG. 2 and includes disconnecting switches activated by signals produced in FIG. 5.

From the four signals $S_1$–$S_4$, the six combinations of pairs of signals are used in the six parallel circuits of FIG. 3. It is assumed for the present description that the signals $S_1$–$S_4$ are electrical signals produced by appropriate sensing transducers, and that the components of FIGS. 3–6 are electronic components, but it will be apparent that the implementation of the invention may also be performed by mechanical, hydraulic, pneumatic or other means.

As shown in FIG. 3, each of the signals is properly scaled by potentiometers $P_1$–$P_{12}$ as a function of the relationship of the feedback signal to the controlled variable, and each scaled pair of signals is combined by summing amplifiers $A_1$–$A_6$ to produce six individual estimates of the variable Y being controlled. These estimates of the variable are shown as $Y_1$–$Y_6$. The settings of potentiometers $P_1$–$P_{12}$ are held constant and are predetermined by the process being equal to transfer coefficients for translating combinations of sensed parameters into estimates of the variable being controlled. An example showing a preferred method of establishing these transfer coefficients is given below. Let $P_{1A}$, $P_{2A}$ be the transfer coefficients corresponding to the settings of potentiometers $P_1$, $P_2$ in FIG. 3 that produce the first estimate of a controlled variable $Y_{1A}$ from signals $S_1$, $S_5$. Similarly, let $P_{1B}$ and $P_{2B}$ be corresponding transfer coefficients for estimating $Y_{1B}$ from $S_1$, $S_2$. Two tests are performed each involving changes to one of the valves $U_1$, $U_2$ on either the engine or a model of the engine. The corresponding changes in $S_1$, $S_2$, $Y_A$ and $Y_B$ are noted. The information obtained corresponds to the increment terms ($\Delta S_1$, $\Delta S_2$, $\Delta U_1$, $\Delta Y_A$, $\Delta Y_B$) in equations (1) through (8) below:

$$\Delta S_1 = \delta S_1/\delta U_1 \; \Delta U_1$$

Eq. (1)

$$\Delta S_2 = \delta S_2/\delta U_1 \; \Delta U_2$$

Eq. (2)

$$\Delta Y_A = \delta Y_A/\delta U_1 \; \Delta U_1$$

Eq. (3)

$$\Delta Y_B = \delta Y_B/\delta U_1 \; \Delta U_1$$

Eq. (4)

$$\Delta S_1 = \delta S_1/\delta U_2 \; \Delta U_2$$

Eq. (5)

$$\Delta S_2 = \delta S_2/\delta U_2 \; \Delta U_2$$

Eq. (6)

$$\Delta Y_A = \delta Y_A/\delta U_2 \; \Delta U_2$$

Eq. (7)

$$\Delta Y_B = \delta Y_B/\delta U_2 \, \Delta U_2$$

Eq. (8)

Equations (1) through (8) are solved to obtain the partial differential coefficients $\delta S_1/\delta U_1$, $\delta S_2/\delta U_1$, $\delta Y_A/\delta U_1$, $\delta Y_B/\delta U_1$, $\delta S_1/\delta U_2$, $\delta S_2/\delta U_2$, $\delta Y_A/\delta U_2$, $\delta Y_B/\delta U_2$. These partial differential coefficients can then be transposed by those skilled in matrix algebra to evaluate the transfer coefficients $P_{1A}$, $P_{1B}$, $P_{2A}$, $P_{2B}$ shown in equations (9) and (10).

$$\Delta Y_A = P_{1A} \, \Delta S_1 + P_{2A} \, \Delta S_2$$

Eq. (9)

$$\Delta Y_B = P_{1B} \, \Delta S_1 + P_{2B} \, \Delta S_2$$

Eq. (10)

The matrix representation of equations (1), (2), (5) and (6) is given by equation (11); equations (3), (4), (7) and (8) are represented by equation (12) and equations (9) and (10) are represented by equation (13).

$$\Delta S = A \, \Delta U$$

Eq. (11)

$$\Delta Y = B \, \Delta U$$

Eq. (12)

$$\Delta Y = P \, \Delta S$$

Eq. (13)

Matrix P is determined from matrixes A and B by the matrix equation shown in equation (14).

$$P = BA^{-1}$$

Eq. (14)

where $$A = \begin{bmatrix} \dfrac{\partial S_1}{U_1} & \dfrac{\partial S_1}{U_2} \\ \dfrac{\partial S_2}{U_1} & \dfrac{\partial S_2}{U_2} \end{bmatrix},$$

$$B = \begin{bmatrix} \dfrac{\partial Y_A}{U_1} & \dfrac{\partial Y_A}{U_2} \\ \dfrac{\partial Y_B}{U_1} & \dfrac{\partial Y_B}{U_2} \end{bmatrix},$$

and $$P = \begin{bmatrix} P_{1A} & P_{2A} \\ P_{1B} & P_{2B} \end{bmatrix}$$

In some applications it may be necessary to add a constant term to the scaling factor by means of an adder. The values of the estimates of the variable $Y_1$–$Y_6$ are tapped off for further use in FIG. 5.

The weighting factors identified as $W_1$–$W_6$ are applied to the corresponding values of the variable Y by potentiometers $P_{13}$–$P_{18}$. As described previously, the scaling factors are selected to give more weight to the more reliable combinations of sensed signals for estimating the variable, and a preferred way of selecting the weighting factors is to make them inversely proportional to the root-sum-square error in the variable Y that results from one standard deviation in error in each of the pair of sense parameters $S_1$–$S_4$.

Each of the potentiometers $P_{13}$–$P_{18}$ is a dual potentiometer, one for weighting the estimate of the variable $Y_1$–$Y_6$, and the other for defining the weighting factor being used. As shown schematically, the secondary potentiometer is supplied by a constant reference voltage R. The output from this potentiometer is equal to the weighting factor. Consequently, the dual potentiometers $P_{13}$–$P_{18}$ each produce two outputs, one consisting of the validated weighted estimates of the variables shown as $Y_1W_1$, $Y_2W_2$...$Y_6W_6$, and the other being the corresponding weighting factors $W_1$, $W_2$...$W_6$.

As will be described subsequently, an estimate of the variable which differs by more than a specified amount from the weighted average estimate of the variable is eliminated from consideration. Whether or not the estimate of the variable produced by a specified pair of feedback signals is used in the revised estimate of the variable is determined by an editing signal V computed for each of the estimates of the variable. For example, if the weighted estimate of the variable $Y_1W_1$ produced from the combination of feedback signals $S_1$, $S_2$ is considered to be invalid, an editing signal $V_1$ is generated in FIG. 5 which is of a positive polarity, and a normally closed double pole switch $Q_1$ is opened thereby setting both the weighted estimate of the state variable $Y_1W_1'$ and the corresponding weighting factor $W_1'$ equal to zero. If the editing signal $V_1$ is zero thereby indicating that the estimate of the variable produced by the combination of feedback sensors $S_1$ and $S_2$ is a valid estimate, the switch $Q_1$ remains closed and the validated outputs $Y_1W_1'$ and $W_1'$ are equal to the signals produced by the potentiometer $P_{13}$, $Y_1W_1$ and $W_1$. Validated signals $Y_1W_1'$ and $W_1'$ are passed on to FIG. 6, while the nonvalidated signals $Y_1W_1$ and $W_1$ are passed on to FIG. 4. Corresponding editing signals $V_2$–$V_6$ and corresponding double pole switches $Q_2$–$Q_6$ perform the same computations for the estimates of the variable; $Y_2$–$Y_6$, produced by the other five combinations of sensor signals.

Figure 4:
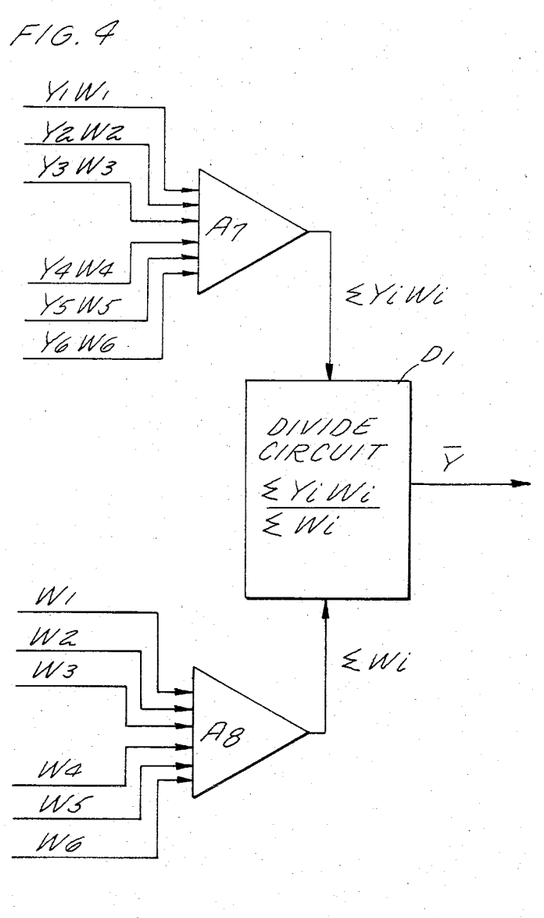
FIG. 4 is a schematic diagram of a preferred implementation of the multiple estimates of the controlled variables computations of FIG. 2.

FIG. 4 shows how the weighted average estimate of the control state variable, before editing, is performed. The computations performed in FIG. 4 are analogous to those shown in block 17 of FIG. 2.

Referring to FIG. 4, the six weighted estimates of the controlled variable $Y_1W_1$–$Y_6W_6$ are summed by amplifier $A_7$, while the weighting factors for the six weighted estimates $W_1$–$W_6$ are summed by amplifier $A_8$. The outputs from each of the amplifiers $A_7$ and $A_8$ are fed to a divide circuit $D_1$ which divides the summed variable estimates by the summed weighting factors to obtain the weighted average estimate of the control state variable before editing, Y.

Figure 5:
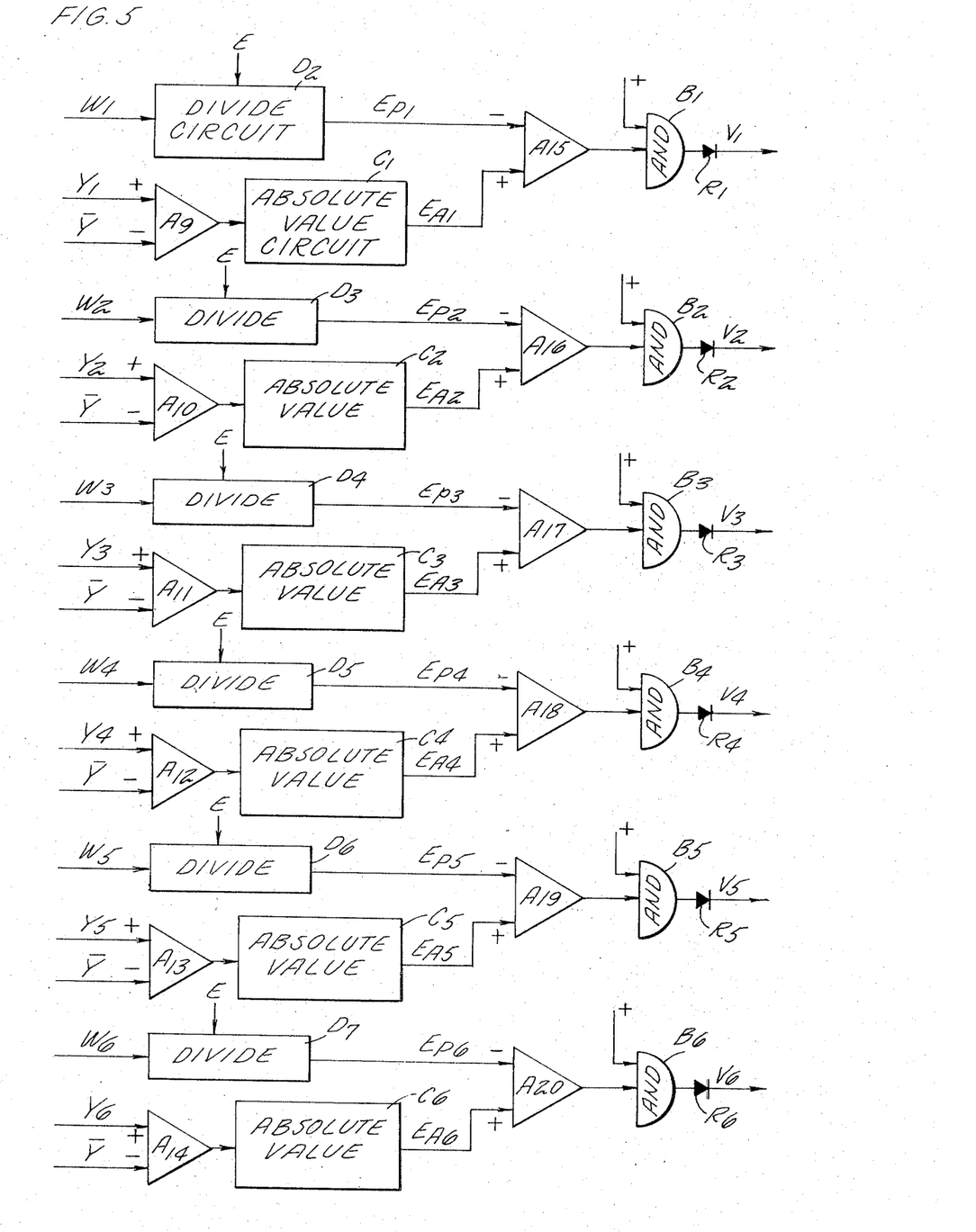
FIG. 5 is a schematic diagram of a preferred implementation of the data editing computation used in conjunction with the disconnecting switches of FIG. 3.

The editing signals $V_1$–$V_6$ used in computations of FIG. 3 are determined in FIG. 5. Here again there are six identical parallel circuits, one for each estimate of the controlled variable. In the circuits of FIG. 5, the difference between the estimates of the controlled variable $Y_1$–$Y_6$ produced in the circuitry of FIG. 3, and the average weighted estimate of the controlled variable Y which is computed in FIG. 4, are compared with a permissible error E. If the difference between each estimate of the controlled variable and the weighted average estimate is small and falls within the allowable range of error, no action is taken and the original estimate of the controlled variable is used in the final estimate of the controlled variable shown in FIG. 6. If, however, an estimate of the controlled variable $Y_1$–$Y_6$ differs significantly from the weighted average estimate of the controlled variable Y, it will likely fall outside the range of the permissible error E and will therefore be edited by setting the appropriate weighting factor to zero. The edited estimate is thereby eliminated from the computation of the final estimate performed in FIG. 6.

Referring to FIG. 5, a signal indicative of a permissible error, E, is fed to the plurality of divide circuits $D_2$–$D_7$. The permissible error E may be determined in any known manner, and will obviously depend upon the characteristics of the control system and the allowable deviation in the estimate of the controlled variable. In a specific rocket engine example, with thrust as the controlled variable, an editing boundary of two standard deviations was found to give minimum error; that is, if the difference between the estimate such as $Y_1$ produced by the feedback sensors $S_1$ and $S_2$ is within two standard deviations of the weighted average estimate Y, the estimate of the control variable is considered valid and is not deleted from the system. If the difference is greater than two standard deviations, the editing procedure will delete this estimate of the controlled variable from the computation. The system will operate satisfactorily with a large range of permissible errors, for example, between 1 and 12 standard deviations from the mean, depending on the characteristics of the control system. Higher values result in higher errors if a sensor failure occurs, while lower values result in increased editing.

Referring specifically to FIG. 5, the permissible error E is fed to the divide circuits $D_2$–$D_7$. Each of the divide circuits is also provided with the appropriate weighting factor $W_1$–$W_6$, and the permissible error E is divided by the appropriate weighting factor to produce a permitter error signal $E_P$ for each of the parallel circuits. This procedure allows a higher error for those estimates of the control variable which are assigned a lower weight.

The weighted average estimate of the variable, Y, generated in FIG. 4 is fed to each of the difference amplifiers $A_9$–$A_{14}$. The individual estimate of the state variable $Y_1$–$Y_6$ is also fed to the appropriate amlifier $A_9$–$A_{14}$. The output from the amplifiers $A_9$–$A_{14}$ is the difference between the average estimate of the state variable Y and each individual estimate of the state variable. These differences are then processed through an absolute value circuit shown as $C_1$–$C_6$ and the absolute value of the error $E_A$ in each of the parallel circuits is fed to a difference amplifier $A_{15}$–$A_{20}$ in a positive polarity while the permitted error $E_P$ in each of the parallel circuits is fed to the amplifiers $A_{15}$–$A_{20}$ with a negative polarity. The resultant output signals from the amplifiers $A_{15}$–$A_{20}$ are fed to the AND circuits $V_1$–$V_6$ respectively.

A positive reference signal is fed to each of the AND circuits $B_1$–$B_6$. If the absolute error $E_A$ for any of the six parallel circuits is greater than the permitted error $E_P$, the signal entering the respective AND gate from the difference amplifier will be positive and the AND circuit will produce a positive output which passes through the diodes R and produces a positive value to the signal $V_1$–$V_6$. If the absolute error $E_A$ is less than the permitted error $E_P$, the output from the AND gate is negative and a negative signal will not pass through the diode R thereby providing a value to the editing signal $V_1$–$V_6$ of zero. The editing signals $V_1$–$V_6$ are passed back to the switches in FIG. 3, a positive editing signal actuating its respective double pole switch $Q_1$–$Q_6$ to thereby set the respective value of the estimate of the controlled variable $Y_1W_1'$–$Y_6W_6'$ and the weighting factor $W_1'$–$W_6'$ to zero. If the editing signal is zero, the respective switch $Q_1$–$Q_6$ remains in its closed position and the estimate of the controlled variable and the weighting factor used in the computations of FIG. 6 remain equal to the original estimates and used in the computations performed in FIG. 4.

Figure 6:
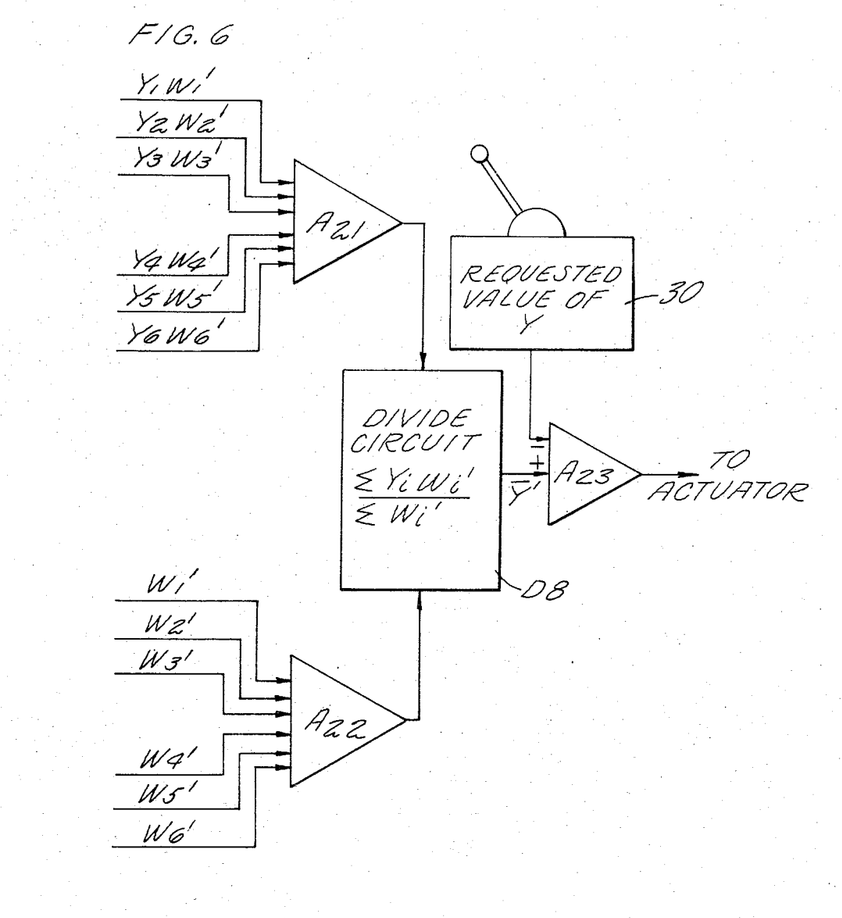
FIG. 6 is a schematic diagram of a preferred implementation of the weighted average of valid estimates computation of FIG. 2.

The validated weighted estimates of the state variable $Y_1W_1'$–$Y_6W_6'$ are fed in FIG. 6 to summing amplifier $A_{21}$, while the corresponding values of the weighting factors $W_1'$–$W_6'$ are summed by amplifier $A_{22}$. One or more of the signals fed to amplifiers $A_{21}$ and $A_{22}$ may be zero depending on the validity computations of FIG. 5. The summed signals from amplifiers $A_{21}$ and $A_{22}$ are fed to a divide circuit $D_8$ which provides the validated estimate of the controlled variable $Y'$. This signal is then compared to the requested value of the variable Y determined from any source such as a power lever input shown at 30 to produce in amplifier $A_{23}$ the error signal Y error that is used to control the actuators which regulate the engine plant or process and null the error signal.

Circuitry similar to FIGS. 3–6 would be required to compute the estimate of the other system variable $Y_B$ shown schematically in FIG. 2.

The editing procedure described in connection with the present invention deletes individual estimates of the controlled variables rather than the sensors. The sensor which provides the signal is judged not on its own error, but on the error in the estimate of the controlled variable. This procedure edits not only erroneous signals but also a balancing fraction of the good signals in order to avoid bias that can result from editing only the erroneous signal. The following example is provided to clarify this point.

Consider a system as described previously having four signals. Let equal weighting factors be assigned to each of the six combinations of signals. The table below shows typical values for the signals $S_1$ through $S_4$ expressed as a percentage of the maximum value, for the transfer coefficients $P_1$ through $P_{12}$, for the six estimates of the controlled variable $Y_A$ ($Y_1$ through $Y_6$), and for the components of each estimate ($Y_1 = S_1P_1 + S_2P_2$, $Y_2 = S_1P_3 + S_3P_4$, etc.).

TABLE 1

| $S_1$=86.4 | $S_2$=79.1 | $S_3$=76 | $S_4$=80.1 | $Y_A$ | W |
|---|---|---|---|---|---|
| $P_1$=.51 $S_1P_1$=44.1 | $P_2$=.65 $S_2P_2$=51.4 | | | $Y_1$=95.5 | $W_1$=1 |
| $P_3$=1.21 | | $P_4$=–.119 | | | |

TABLE 1 -Continued

| $S_1=86.4$ | $S_2=79.1$ | $S_3=76$ | $S_4=80.1$ | $Y_A$ | $W$ |
|---|---|---|---|---|---|
| $S_1P_3=104.5$ | | $S_3P_4=-9.0$ | | $Y_2=95.5$ | $W_2=1$ |
| $P_5=1.1$ $S_1P_5=95.0$ | | | $P_6=.0062$ $S_4P_6=0.5$ | $Y_3=95.5$ | $W_3=1$ |
| | $P_7=1.43$ $S_2P_7=113$ | $P_8=2.2$ $S_3P_8=175$ | | $Y_4=95.5$ | $W_4=1$ |
| | $P_9=.60$ $S_2P_9=47.5$ | | $P_{10}=.60$ $S_4P_{10}=48$ | $Y_5=95.5$ | $W_5=1$ |
| | | $P_{11}=-2.22$ $S_3P_{11}=-168.8$ | $P_{12}=3.3$ $S_4P_{12}=264.3$ | $Y_6=95.5$ | $W_6=1$ |

The average estimate of $Y_A$ is given by the summation of all valid terms divided by the summed weighting factor, namely:

$$Y_A = Y_1 + Y_2 + Y_3 + Y_4 + Y_5 + Y_6/W_1 + W_2 + W_3 + W_4 + W_5 + W_6$$

Eq. (15)

$Y_A = 95.5 + 95.5 + 95.5 + 95.5 + 95.5 + 95.5/1 + 1 + 1 + 1 + 1 + 1$ $Y_A = 95.5$.

If sensor $S_3$, for example, were invalid and all terms involving $S_3$ were edited by setting the appropriate weighting factors to zero, then $W_2$, $W_4$ and $W_6$ would be set to zero and the resulting estimate of $Y_A$ would be unchanged:

$Y_A = 95.5 + 0 + 95.5 + 0 + 95.5 + 0/1 + 0 + 1 + 0 + 1 + 0$ $Y_A = 95.5$, which is a correct estimate.

In contrast, if the value of $Y_A$ were estimated from the conventional approach of partial derivatives the same answer would be obtained when all sensors were valid but an incorrect answer may be given when one sensor is edited, namely:

$$Y_A = (\delta Y_A/\delta S_1)S_1 + (\delta Y_A/\delta S_2)S_2 + (\delta Y_A/\delta S_3)S_3 + (\delta Y_A/\delta S_4)S_4$$

Eq. (16)

For this example, $Y_A = 0.470 \times 86.4 + 0.447 \times 79.1 - 0.428 \times 76 + 0.651 \times 80.1$ $Y_A = 40.6 + 35.3 - 32.5 + 52.1$ $Y_A = 95.5$, which is also a correct estimate.

If, however, sensor $S_3$ were edited the estimate of $Y_A$ would be $Y_A = 0.470 \times 86.4 + 0.447 \times 79.1 - 0 + 0.651 \times 80.1$ $Y_A = 128$, which is an incorrect estimate.

It can be seen that just deleting one sensor of a set can lead to an incorrect estimate of the controlled variable, whereas an editing procedure that deletes individual estimates of the controlled variable avoids this editing bias.

The previous description has been given in terms of a rocket engine. The same type of control could be provided for a nonaugmented twin spool turbojet engine with a variable exhaust area. The four sense signals $S_1$–$S_4$ could be, for example, low rotor speed, high rotor speed, burner pressure and exhaust area. The variables being controlled could be turbine inlet temperature and low spool stall margin, neither of which can be directly sensed. The actuators would control fuel flow and jet area.

For those engines that have a significant difference in dynamic response of the sensor signals, it may be necessary to increase the permitted error E during an engine transient in order to avoid deleting good signals. It is also important that spurious transients such as those caused by sensor failures or editing do not result in incorrect editing. A preferred circuit for providing a larger permitted error E during a transient is shown in FIG. 7. Referring to the figure, the unedited estimate of the variable Y is fed as an input into a servomotor 30 that has a slower response than the engine. As shown in the figure, the output from the servomotor 30 is fed back to the input through an amplifier to provide a position error $\Delta Y$ which is equal to the lag of the servomotor 30, and which is proportional to the transient being experienced by the estimate of the controlled variable Y. The position error $\Delta Y$ can be obtained directly in a digital control from the difference in values of Y between successive sampling periods. The transient rate signal $\Delta Y$ is scaled through a potentiometer $P_{19}$ and passed through an absolute value circuit $C_7$ to give an increase in permitted error during the transient. The increase in error is added to the reference permitted error in amplifier $A_{24}$ to provide the modified error $E_M$ which may be used in FIG. 5 in place of E.

As indicated previously, the circuits of FIGS. 3–6 provide an estimate of one variable, and at least one other similar circuit will be required in the control system of FIG. 2 to compute the estimate of the other variable. The similar circuitry can contain the same number of elements with separate editing being carried out for each variable. For example, in the case of a rocket engine, different combinations of sensors may be edited for thrust than are edited for mixture ratio. On the other hand, if lower precision is acceptable for one of the controlled variables, for example mixture ratio, then the editing decisions made on the basis of thrust may be applied to the computation of mixture ratio, and the circuitry of FIGS. 4 and 5 may be omitted from the mixture ratio cicuit since it would be redundant.

Circuits similar to those in FIGS. 3–6 may also be used for safety purposes. For example, three controlled circuits could be used in a rocket engine, namely, thrust, mixture ratio and fuel pump speed. The fuel pump speed signal would override the thrust circuit when the speed limit was reached.

Although the present invention has been described in terms of an engine control system, it will be apparent to those skilled in the art that numerous other control systems may be implemented in the form of a self-correcting control as described herein. It also is apparent that numerous changes may be made to the construction of the invention and its precise details without departing from the scope of the invention as hereinafter claimed.

I claim:

1. In a control system for a controlled device having a pair of actuators for regulating the controlled device, said actuators being responsive to first and second variables of operation of said controlled device, said controlled device having connected therewith a plurality of sensors each of which is adapted to produce a signal which is indicative of a condition of operation of said controlled device and which is a function of at least one of the variables of operation of said controlled device, the improvement which consists of producing from said sensor signals an estimate of said one variable of operation comprising     means for scaling each of said sensor signals as a function of its relationship to said one variable of operation,     means for generating from a plurality of pairs of said scaled sensor signals a plurality of estimate signals indicative of the value of said one variable of operation,     means for producing from said estimate signals an average signal indicative of the average of said plurality of estimate signals,     means responsive to the difference between each of said estimate signals and said average signal for setting to zero any of said estimate signals which are outside a predetermined range,     and means for producing a revised average signal of said one variable in response to the remaining estimate signals.

2. A control system as in claim 1 and including means for producing for each of said estimate signals a weighting signal,     means for modifying each said estimate signal in accordance with its respective weighting signal to produce a plurality of weighted estimate signals,     means for summing said weighting signals to produce a summed weighting signal,     and means for producing from said weighted estimate signals and said summed weighting signals a weighted average signal which is indicative of the weighted average of said one variable.

3. A control system as in claim 2 and including means responsive to the difference between each said estimate signal and said average signal for setting to zero the respective weighting signals associated with each said estimate signal which is set to zero,     means for summing the remaining weighting signals which have not been set to zero to produce therefrom a revised summed weighting signal,     and means for modifying said revised average signal in response to said revised summed weighting signal to produce therefrom a revised weighted average signal for said one variable.

4. A control system as in claim 1 and including means for reinstating each estimate signal which has been set to zero when the estimate signal differs from said average signal by less than a predetermined amount.

5. A control system as in claim 1 and including means for producing a reference signal indicative of the desired value of said variable of operation,     means for comparing said revised mean signal with said reference signal to produce therefrom a control signal proportional to the difference therebetween,     and means for supplying said control signal to at least one of said actuators to thereby null said control signal.

6. A control system as in claim 2 in which said means for producing a weighting signal and said means for modifying each said estimate signal to produce a weighted estimate signal includes a dual potentiometer connected with each of said estimate signals.

7. In a self-correcting control system for a controlled device having a plurality of actuators for regulating a plurality of variables of operation of said controlled device, the improvement of producing a signal indicative of the value of one of said variables of operation from a plurality of sensor signals each of which is indicative of a condition of operation of said controlled device and is a function of said variables of operation comprising     means for scaling each of said sensor signals as a function of its relationship with said variable of operation,     means for producing from selected combinations of said scaled sensor signals a plurality of independent estimate signals each of which representative of the value of said variable of operation,     first summing means for summing said plurality of estimate signals and producing therefrom an average signal indicative of the average of said plurality of estimate signals,     means for comparing each of said estimate signals with said average signal to produce a difference signal,     a permitted error signal,     means for comparing each said difference signal with said permitted error signal and producing an editing signal for each said difference signal when said difference signal exceeds said permitted error signal,     means responsive to the occurrence of an editing signal for setting the respective estimate signal to zero,     and second summing means for summing the remaining estimate signals which have not been set to zero and producing therefrom a revised average signal indicative of the estimated value of said variable of operation.

8. A control system as in cliam 7 and including means for varying the magnitude of said permitted error signal when said revised average signal is changing at a rate above a preselected rate of change.

9. A control system as in claim 7 and including means for producing for each of said estimate signals a weighting signal,     means for modifying each said estimate signal in accordance with its respective weighting signal to produce a plurality of weighted estimate signals,     means for summing said weighting signals to produce a summed weighting signal,     and means for producing from said weighted estimate signals and said summed weighting signals a weighted average signal which is indicative of the weighted average of said one variable.

10. A control system as in claim 9 and including means responsive to the difference between each said estimate signal and said average signal for setting to zero the respective weighting signals associated with each said estimate signal which is set to zero, means for summing the remaining weighing signals which have not been set to zero to produce therefrom a revised summed weighting signal, and means for modifying said revised average signal in response to said revised summed weighting signal to produce therefrom a revised weighted average signal for said one variable.

11. A control system as in claim 9 and including means for dividing the permitted error signal by the weighting signal produced for each said estimate signal to produce a revised permitted error signal for each said estimate signal, and means for comparing the difference signal for each estimate signal with the respective revised permitted error signal to produce each of the said validity signals.

12. A control system as in claim 7 in which said scaling means includes a variable potentiometer connected with each said sensor signal.

13. In a self-correcting control system for a controlled device having a plurality of actuators for regulating a plurality of variables of operation of said controlled device, the improvement of producing a signal indicative of the value of one of said variables of operation from a plurality of sensor signals each of which is indicative of a condition of operation of said controlled device and is a function of said variables of operation comprising the steps of scaling each of said sensor signals as a function of its relationship with said variable of operation, generating from selected combinations of said scaled sensor signals a plurality of independent estimate signals each of which is representative of the value of said variable of operation, summing said plurality of estimate signals and producing therefrom an average signal indicative of the average of said plurality of estimate signals, comparing each of said estimate signals with said average signal and setting to zero any of the estimate signals which differ from said average signal by more than a preselected amount, and summing the remaining estimate signals to produce a revised average signal indicative of the estimated value said one variable of operation.

14. A self-correcting control system as in claim 13 and including the steps of generating a weighting signal for each of said estimate signals, modifying each of said estimate signals in response to its respective weighting signal to produce a plurality of weighted estimate signals, summing said weighting signals to produce a summed weighting signal, summing said weighted estimate signals to produce a summed weighted estimate signal, and dividing said summed weighted estimate signal by said summed weighting signal to produce a weighted average signal for said one variable.

15. A self-correcting control system as in claim 14 and including the steps of setting to zero the weighting signal corresponding to each estimate signal which has been sent to zero, summing the remaining weighting signals to produce a revised summed weighting signal, and dividing the revised average signal by said revised summed weighting signal to produce therefrom a revised weighted average signal indicative of the estimated value of said one variable.

16. A method for estimating the value of a variable of operation in a process comprising the steps of producing a plurality of signals each of which is indicative of a condition of operation of said process and is related to said variable of operation, generating from a plurality of combinations of said signals a plurality of independent estimates of the value of said variable of operation, assigning to each said independent estimate a weighting factor to produce a plurality of independent weighted estimates of the value of said variable of operation, summing said plurality of weighted estimates and said weighting factors to produce therefrom a weighted average estimate of the value of said variable of operation, setting of zero the weighted estimates of the value of the variable of operation which deviate from said weighted average estimate by more than a predetermined amount, setting to zero the weighting factors associated with the said weighted estimates of the value of the variable of operation which are set to zero, and producing from the weighted estimates of the value of the variable of operation which are not set to zero and from the weighting factors associated therewith a revised weighted average estimate of the value of said variable of operation.

* * * * *

UNITED STATES PATENT OFFICE
CERTIFICATE OF CORRECTION

Patent No. 3,851,157     Dated November 26, 1974

Inventor(s) Stanley H. Ellis

It is certified that error appears in the above-identified patent and that said Letters Patent are hereby corrected as shown below:

Column 6, line 39, "$S_s$" should be --$S_2$--

Column 8, line 62, "Y" should be --$\overline{Y}$--

Column 9, line 2, "Y" should be --$\overline{Y}$--

Column 9, line 12, "Y" should be --$\overline{Y}$--

Column 9, line 30, "Y" should be --$\overline{Y}$--

Column 9, line 45, "permitter" should be --permitted--

Column 9, line 50, "Y" should be --$\overline{Y}$--

Column 9, line 56, "Y" should be --$\overline{Y}$--

Column 10, line 34, "Y'" should be --$\overline{Y}'$--

Column 12, line 22, "Y" should be --$\overline{Y}$--

Column 12, line 26, "$\triangle Y$" should be --$\triangle \overline{Y}$--

Column 12, line 29, "Y" should be --$\overline{Y}$--

Column 12, line 29, "$\triangle Y$" should be --$\triangle \overline{Y}$--

Column 12, line 31, "Y" should be --$\overline{Y}$--

Column 12, line 32, "$\triangle Y$" should be --$\triangle \overline{Y}$--

Column 12, line 52, "cicuit" should be --circuit--

Signed and Sealed this twenty-third Day of March 1976

[SEAL]

Attest:

RUTH C. MASON
*Attesting Officer*

C. MARSHALL DANN
*Commissioner of Patents and Trademarks*